(12) United States Patent
Meza

(10) Patent No.: US 7,287,257 B2
(45) Date of Patent: Oct. 23, 2007

(54) AUTOMATIC EMBEDDED HOST CONFIGURATION SYSTEM AND METHOD

(75) Inventor: Joseph R. Meza, Fremont, CA (US)

(73) Assignee: Oxford Semiconductor, Inc., Milpitas, CA (US)

( * ) Notice: Subject to any disclaimer, the term of this patent is extended or adjusted under 35 U.S.C. 154(b) by 67 days.

(21) Appl. No.: 10/680,285

(22) Filed: Oct. 7, 2003

(65) Prior Publication Data

US 2004/0073912 A1 Apr. 15, 2004

Related U.S. Application Data

(62) Division of application No. 09/698,681, filed on Oct. 27, 2000, now abandoned.

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/321; 709/220; 709/245

(58) Field of Classification Search ........ 719/321–327, 719/310, 313; 709/200, 201, 220, 230–232, 709/238, 245–246
See application file for complete search history.

(56) References Cited

U.S. PATENT DOCUMENTS

| | | | | |
|---|---|---|---|---|
| 6,023,585 A | * | 2/2000 | Perlman et al. | ............ 717/178 |
| 6,098,065 A | * | 8/2000 | Skillen et al. | .................. 707/3 |
| 6,611,881 B1 | * | 8/2003 | Gottfurcht et al. | ............ 710/18 |
| 6,883,000 B1 | * | 4/2005 | Gropper | ....................... 707/10 |
| 6,931,593 B1 | * | 8/2005 | Grooters | ...................... 715/717 |
| 6,966,028 B1 | * | 11/2005 | Beebe | ......................... 715/517 |
| 2004/0181593 A1 | * | 9/2004 | Kanojia et al. | .............. 709/220 |
| 2005/0149532 A1 | * | 7/2005 | Hubbard | ....................... 707/10 |
| 2006/0129688 A1 | * | 6/2006 | Chatani et al. | ............. 709/229 |

OTHER PUBLICATIONS

Microsoft Replication for MS SQL Server Version 7.0, Microsoft TechNet, Jul. 19, 2001, pp. 1-15.*

* cited by examiner

*Primary Examiner*—William Thomson
*Assistant Examiner*—Diem K Cao
(74) *Attorney, Agent, or Firm*—Klein, O'Neill & Singh, LLP

(57) ABSTRACT

A system and method for automatically detecting the attachment of a peripheral device to a host system, and configuring the host system for communication with the peripheral device is described. In accordance with an aspect of the invention, when a peripheral device is attached to the host system, the host detects the attachment of the device. If a device driver for controlling and communicating with the peripheral device is locally available, then the host system installs and loads the device driver. If the device driver is not locally present, then the host system establishes a connection with a server system that includes a database with the device driver needed for operation of the device. The device driver is forwarded to the host system and is then integrated into the host's system software, so that the host can communicate with and control the peripheral device. In accordance with certain aspects of the invention, advertisements or other relevant information about the peripheral device or the host system is displayed to a user, when the host system detects the attachment of the device.

14 Claims, 7 Drawing Sheets

AUTOMATIC EMBEDDED HOST CONFIGURATION SYSTEM AND METHOD

This is a divisional of application Ser. No. 09/698,681 filed Oct. 27, 2000 now abandoned.

BACKGROUND

Field of Invention

This invention relates to the field of a computer software, and particularly, the detection of attachment of peripheral devices to a host system.

COPYRIGHT AND TRADEMARK NOTICE

A portion of the disclosure of this patent document contains material which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be registered trademarks of third parties affiliated or unaffiliated with the applicant or the assignee. Use of these marks is for the purpose of providing an enabling disclosure by way of example and shall not be construed to limit the scope of this invention to material strictly associated with such marks.

RELATED ART

Advancements in computer technology have lead to development of smart devices also referred to as embedded systems. Embedded systems are specialized computers used to control devices such as automobiles, home and office appliances, and handheld units of all kinds. Generally, in embedded systems, the operating system and application functions are combined in the same program. An embedded system typically only performs a fixed and specific set of functions programmed into a non-volatile memory (e.g., ROM, flash memory, etc.) in contrast to a general-purpose computing machine that can be programmed to perform many different functions. As such, most embedded systems have limited resources that support only specific functions. Most embedded systems do not support storage of large volumes of data as a general-purpose computer does.

On occasions, it is desirable to attach peripheral devices to embedded systems for additional functionality. For example, some portable handheld computing systems such as Personal Digital Assistants (PDA's) are now designed to receive attachment modules that can convert or modify the system's operation. For example, Visor™, an electronic PDA from Handspring Corporation, Mountain View, Calif., accepts various modules that allow the attachment of peripheral devices such as a digital camera, modem, or other electronic devices.

Once a peripheral device is attached to an embedded device, hereinafter also referred to as a host system, it is necessary for the host system to control and communicate with the peripheral device. Typically, the host's ability to communicate and control a device is possible through the installation of a device driver for that device. A device driver is program routine (software) that provides for means of communication between a peripheral device and the system software (e.g., the operating system) running on the host system. A device driver is written by programmers who have detailed knowledge of the peripheral device's command language and characteristics as well as the system software that runs on the host system. As such, a device driver for a specific device dictates the precise machine language necessary to perform the functions requested by system software controlling the device.

Certain fundamental drivers that manage the essential components of a host system are included in the system BIOS (Basic Input Output System). BIOS includes a set of routines, which is stored on a memory chip and provides an interface between the operating system and the hardware. However, when a new hardware device is added or attached to the system, the driver for that device needs to be loaded in order to control the operation of the device. After the driver is loaded, the operating system running on the host system communicates with the driver and the driver communicates with the device.

There are several problems associated with device drivers. First, if a device driver for a device is not available on the host system, then it has to be installed by the user. Typically, many devices are sold with portable data storage mediums such as CD ROMs or floppy disks that include the device driver. Thus, a host system needs to include mechanisms such as a CD ROM or floppy drive to read and install the driver. Second, if the device is replaced with a newer model or a newer version of the driver is available, the driver needs to be updated. Third, installation of device drivers requires large amounts of data storage space, if the host system is to support a variety of peripheral devices.

As it can be imagined, the above problems can substantially limit the potential for an embedded system to act as a host, because embedded systems do not have the same storage space capabilities or mechanisms available in personal computers. For example, a PDA does not have a floppy or CD ROM drive and therefore cannot load a device driver from a floppy or CD ROM. Some device manufacturers provide the device drivers for download over the Internet. However, many embedded devices (e.g., set-top boxes, Internet gateways, DSL providers) may not be equipped with user interface tools to efficiently allow a user to navigate the Internet to find and install the appropriate driver or such drivers may not be generally available. Further, as stated earlier, most embedded systems lack sufficient memory or data storage space to support the storage of many device drivers for various devices.

Another problem with the use of device drivers is the inconvenience associated with the installation of a driver. In order to use and operate a new device, a user has to manually search for and install the driver and further configure the host to recognize the driver and the device, thus requiring a user to wait and perform certain chores before he or she can even use the device. To overcome this problem, a number of solutions have been implemented. For example, the Plug and Play™ communication protocol is a standard used in the design of personal computer expansion boards, developed by Intel® Corporation, Santa Clara, Calif. Plug and Play is supported directly in Windows 95/98/2000, the operating system developed for personal computers by Microsoft® Corporation, Redmond, Wash. Using this technology, once a device is attached to the system, system settings (e.g., IRQ and DMA settings) and I/O and memory addresses self configure to recognize a newly attached device. This eliminates the frustration of configuring the system when adding new peripherals that comply with the requirements of the Plug and Play communication protocol.

In addition to the Plug and Play standard, a distributed computing environment from Sun Microsystems® Corporation, Mountain View, Calif., called Jini™ is available in which peripheral devices can be plugged into a network environment and automatically offer their services and make use of other services on the network. Jini turns peripherals into services, so that when a disk drive, for example, is plugged in to the network, it becomes a storage service rather than just another disk drive. Devices that attach to a Jini system must also comport with the requirements of the Jini system.

The above-described protocols and systems are designed and developed for computing systems that meet the memory and data storage requirements needed to support sophisticated operations and functions performed by the hardware and/or software in such systems. For example, implementing Plug and Play requires a system BIOS on the motherboard that supports Plug and Play as well as Plug and Play expansion cards that are typically not available in embedded systems. Jini provides a Java-based distributed computing network that requires a participating host to incorporate a Java virtual machine, and often a Java browser, which are memory intensive and not suited for the limited operating environment available in embedded systems.

The present inventor therefore has determined that it would be useful to be able to automatically load a device driver for a peripheral device on an embedded host system, upon attachment of the device to the system. It would be further useful to display certain related information to a user based on information collected about the attached device and the host system.

The present invention and its advantages over the prior art would be better appreciated and understood by the following review of the currently available device driver architectures in conjunction with the Universal Serial Bus (USB) interface mechanism.

Device Driver Architectures

There are essentially two types of device driver architectures, monolithic and layered. A monolithic driver is essentially a piece of system software designed specifically for the control and communication for a particular device or portion of hardware. The functionality provided by the monolithic driver is typically tied very closely to the particular hardware that the software drives. In comparison, the layered driver usually provides general support for a particular set of hardware interfaces. The software architecture in a layered driver, as the name describes, provides various layers of interfaces. As the layers move away from the specific hardware, they move from broad to narrow in functionality.

While the two driver architectures implement the same functionality, the layered architecture offers more flexibility for supporting different devices and different hardware platforms as future requirements dictate. The monolithic driver, for example, supports a USB Video Camera in the same way the layered driver can, however, if a USB mouse needed to also be supported, a separate monolithic USB mouse driver would be needed. In the case of the layered driver, only a high level driver for the mouse is needed. The other layers, namely the USB protocol support and low-level hardware layer could be reused. In addition, each layer can be written such that it can support multiple layers, thus the USB mouse and USB camera can utilize the lower USB protocol support layer simultaneously.

Driver development has migrated more and more towards layered software architectures as interfaces such as IEEE 1394 and USB have lend themselves to be better utilized if a layered architecture is implemented.

SUMMARY

One or more embodiments of the invention are directed to a system and method for automatically detecting the attachment of a peripheral device to a host system and configuring the host system for communication with the peripheral device. In accordance with an aspect of the invention, when a peripheral device is attached to the host system, the host detects the attachment of the device. The host can be an embedded system such as a set-top box, a mobile phone, a personal digital assistant (PDA), or any other type of computing system. The peripheral device can be a modem, a digital camera, a microphone, or any other device that can be used in conjunction with the host.

In order to communicate and control the operation of the peripheral device, the host system needs special software to interact with the device in a specific command language that is compatible with the requirements of the device. Special software for communicating with peripheral devices is typically provided in form of a code routine known as a device driver. If the device driver is locally available, then host system installs and loads the device driver. By means of the device driver, the host system communicates with and controls the peripheral device. If the device driver is not locally present, then the host system establishes a connection with a server system through a network connection. Alternatively, even if a device driver is locally present, the host system may query the server for a more recent driver. The server system can be a remote server system accessible via the Internet or it can be a server in a local area network.

The server includes a database that includes either the device driver needed for operation of the device, or one or more references to locations where the device driver may be found. Once the appropriate device driver is located, the device driver is forwarded to the host system. The host receives the device driver, installs, and loads it into memory. The device driver is then integrated into the host's system software, so that the host can communicate with and control the peripheral device.

One or more embodiments of the invention are directed to an on-line system that provides directed information delivery to targeted audience who use a particular peripheral device in conjunction with a host system connected to a communication network. In accordance with one aspect of the invention, advertisements or other relevant information about a peripheral device or a host system are displayed to a user, when the host system detects the attachment of the device.

DETAILED DESCRIPTION

The invention is directed to a method and system for automatically configuring a peripheral device attached to a host system. Embodiments of the invention are described by way of example as applicable to devices attached to a host system via a Universal Serial Bus® (USB). The examples provided here are not to be construed to limit the application of the invention to the USB architecture, however. The invention is applicable to any interface that provides for the attachment of a device to a host system, including wireless connections.

In the following, numerous specific details are set forth to provide a thorough description of various embodiments of the invention. It is apparent, however, to one skilled in the art that certain embodiments of the invention may be practiced without these specific details or with some variations in detail. In some instances, well-known features not pertinent to the novelty of the system are described in less detail so as not to obscure the more relevant aspects of the invention.

System Architecture

One or more embodiments of the invention are directed to a system and method for automatically detecting the attachment of a peripheral device to a computing system and configuring the computing system for communication with the peripheral device. Typically, a computing system is composed of two distinct environments, a software environment and a hardware environment. The hardware environment, as it is discussed in further detail below, includes the machinery and equipment that provide an execution environment for the software. On the other hand, the software provides the execution instructions for the hardware.

In operation, a computing system needs both hardware and software to function. The software can be divided into two major classes including system software and application software. System software includes control programs, such as the operating system (OS) and information management systems, that instruct the hardware how to function and process information. An example of system software is Microsoft Windows 2000® operating system generally used for managing the operation of personal computers.

Application software is a program that performs a specific task. In embodiments of the invention, system and application software are implemented to automatically detect the attachment of a peripheral device to a host system and configures the host system to control and operate the device. In certain embodiments of the invention, system and application software may be implemented as firmware in a category of memory chips such as ROM, PROM, EPROM and EEPROM that hold their content without electrical power.

Figure 1:
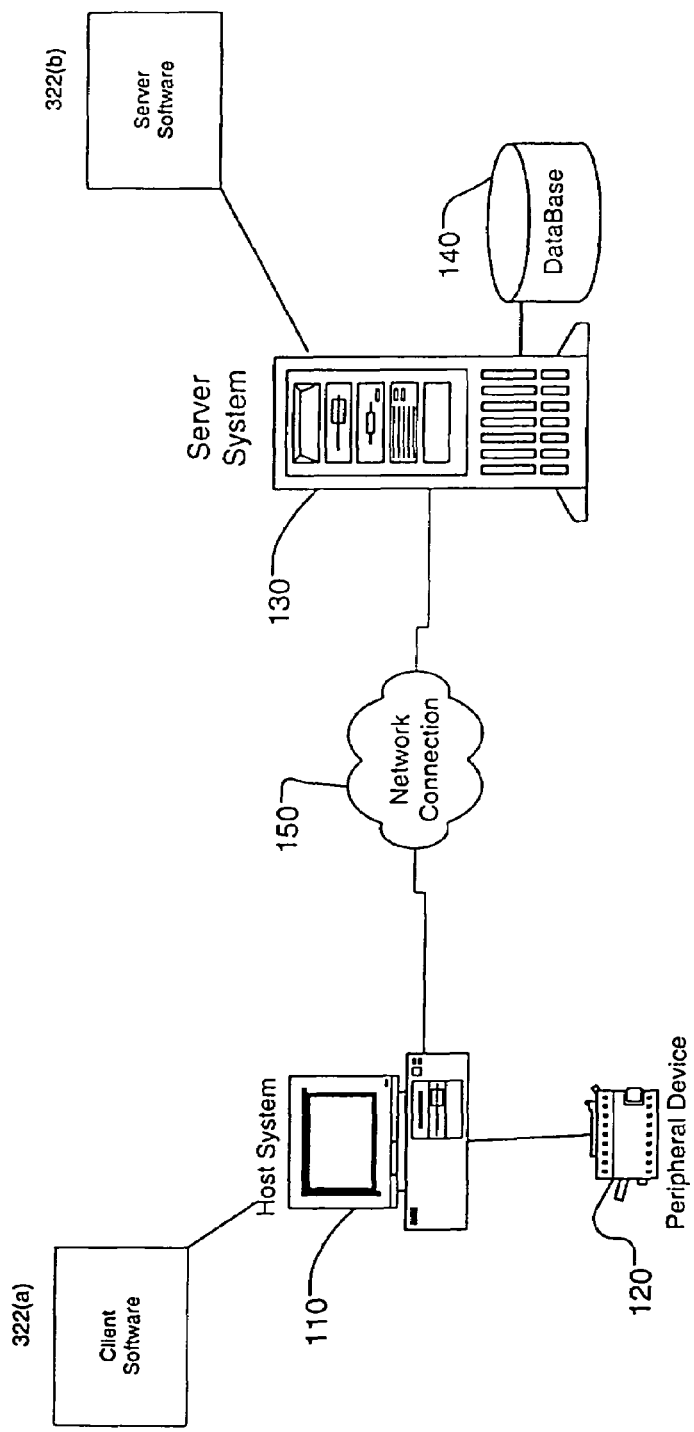
FIG. 1 illustrates a client-server architecture, according to one or more embodiments of the current invention.

FIG. 1 illustrates a system architecture, according to one or more embodiments of the current invention, comprising a host system 110 attached to a server system 130. In some embodiments, host system 110 communicates with server system 130 through network connection 150 to retrieve configuration information associated with peripheral device 120. Server system 130 includes or is in communication with database 140. Database 140 includes configuration information (e.g., device drivers) that can be forwarded through network connection 150 to host system 110.

Figure 2:
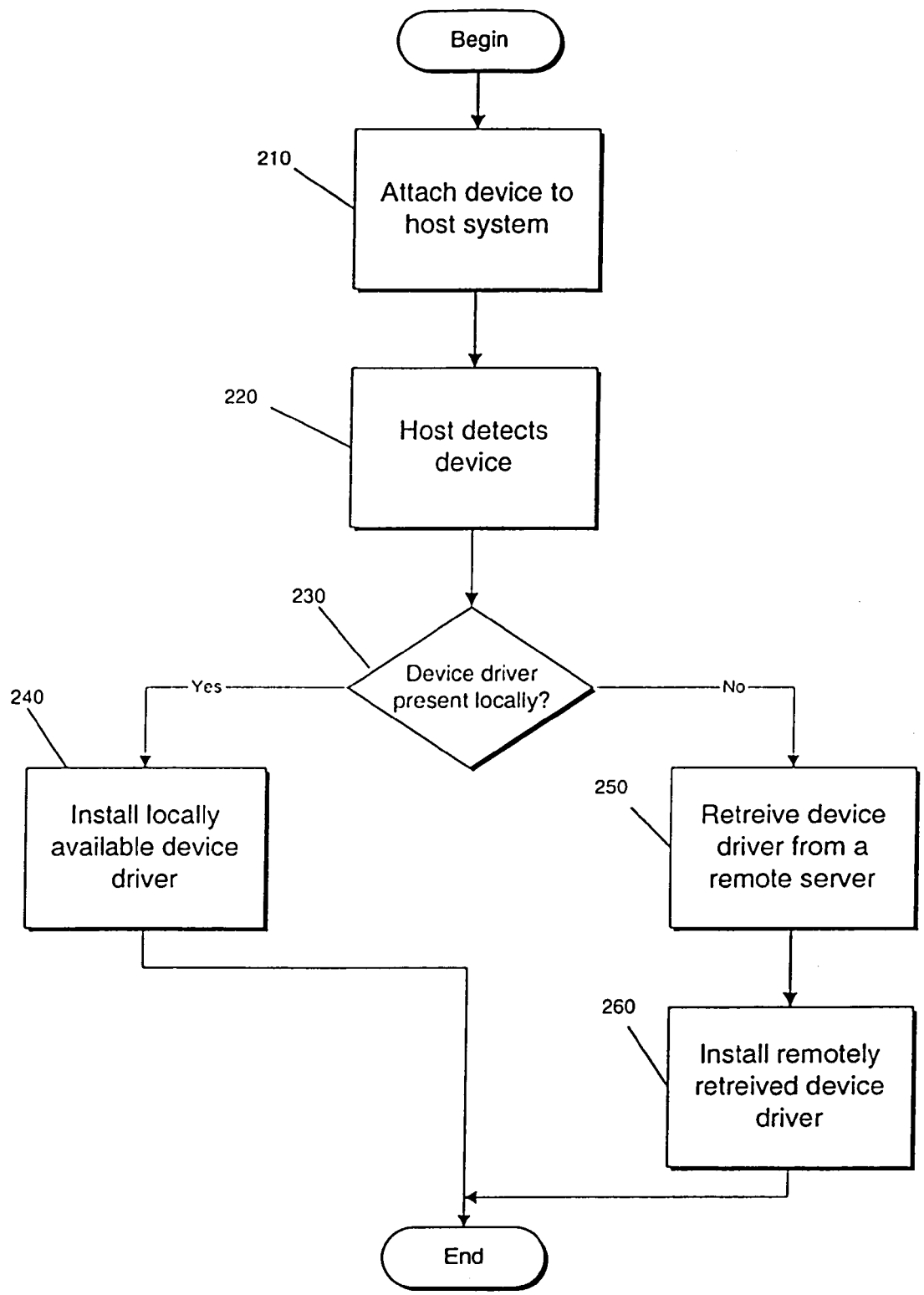
FIG. 2 illustrates a flow diagram of a method of attaching a peripheral device to a host system, in accordance with one or more embodiments of the system.

Host system 110 and server system 130 may be connected in a local area network (LAN), or alternatively in a wide area network (WAN) or worldwide network, such as the Internet. As it is further discussed below, host and server systems 110 and 130 include hardware and software components and system architectures suited for operation of application software of this system. FIG. 2 illustrates a flow diagram of a method of attaching peripheral device 120 to host system 110.

According to one or more embodiments, at step 210 peripheral device 120 is attached to host system 110. Host 110 can be a general purpose computing system such as a desktop or laptop computer. In other embodiments, host 110 is an embedded system such as a set-top box or a personal digital assistant (PDA). Peripheral device 120 can be a modem, a digital camera, a microphone, or any other device that can be used in conjunction with host 110. Embodiments of the invention include an interface that allows for the attachment of device 120 to host 110.

At step 220, host 110 detects the attachment of device 120. In order to communicate and control the operation of device 120, host 110 needs special software to interact with device 120 in a specific command language that is compatible with the requirements of device 120. Special software for communicating with peripheral devices is typically provided in form of a code routine as described above also known as a device driver. The device driver provides for host 110's system software to communicate with device 120. At step 230, host 110 queries the system to determine whether the device driver for the particular device is present locally. The driver is present locally if it is stored on host system 110 or is provided by device 120.

If the device driver is locally available, then at step 240 host system 110 installs and loads the device driver. By means of the device driver, host system 110 communicates with and controls device 120. If the device driver is not locally present, or in search of a newer version of the device driver, host system 110 establishes a connection with server system 130 through network connection 150. Server system 130 can be a remote server system accessible via the Internet or it can be a server in a local area network.

Server 130 includes a database 140 that includes either the device driver needed for operation of device 120, or one or more references to locations (i.e., other servers) where the device driver may be found. Once the appropriate device driver is located, at step 250, the device driver is forwarded via network connection 150 to host 110. At step 260, host 110 receives the device driver, installs, and loads it into memory. As it is described in further detail below, the device driver is then integrated into host 110's system software, so that host 110 can communicate with and control device 120.

The above described system, including the application software 322 for detecting the attachment of peripheral device 120 and configuring host system 110 is implemented in association with hardware system 310 (FIG. 3A) and software system 320 (FIG. 3B) and is described in further detail below. The following hardware and software embodiments are provided by way of example. The invention may be practiced either individually or in combination with other suitable hardware or software architectures or environments not described in detail herein. It should be noted that certain hardware and software component may be interchangeably implemented in form of software or hardware, in one or more embodiments of the invention.

System Hardware Environment

Figure 3A:
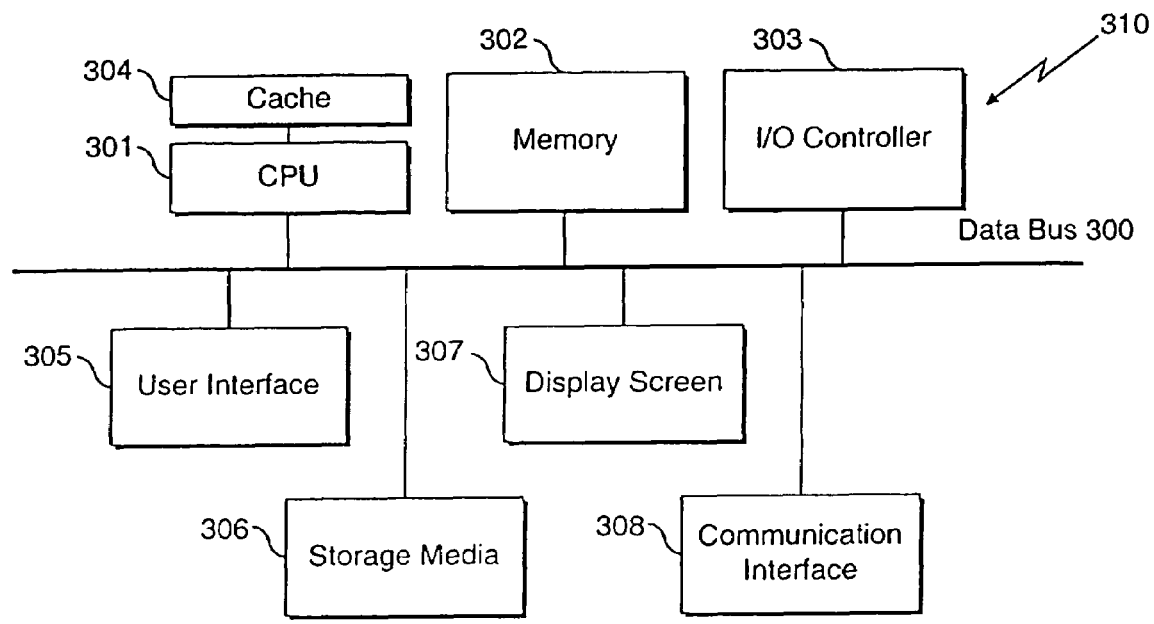
FIG. 3A illustrates an example of the components of the host or server system of this invention, in accordance with one or more embodiments.

An embodiment of the system can be implemented as computer software in the form of computer readable code executed on host 110 or server system 130. Host 110 and server system 130 can be implemented in form of a general purpose computing system 310, in accordance with one or more aspects of the invention. FIG. 3A illustrates an example of the components of computing device 310. Computing device 310 includes a central processor unit (CPU) 301, a main memory 302, an input/output controller 303, optional cache memory 304, user interface devices 305 (e.g., keyboard, pointing device, etc.), storage media 306 (e.g., hard drive, memory, etc.), a display screen 307, a communication interface 308 (e.g., a network card, a modem, or an integrated services digital network (ISDN) card, etc.), and a system synchronizer (e.g., a clock, not shown in FIG. 3A).

Processor 301 may or may not include cache memory 304 utilized for storing frequently accessed information. One or more input/output devices such as a printing or a scanning device may be attached to computing system 310. A communication mechanism, such as a bi-directional data bus 300, can be utilized to provide for means of communication between system components. Host 110 and server 130 may be capable of communicating with one another and other systems through communication interface 308.

In one or more embodiments, host 110 or server 130 may not include all the above components, or may include additional components for additional functionality or utility. For example, host 110 can be a laptop computer or other portable computing device that can send messages and receive data through communication interface 308. The system hardware environment may also be embodied in an embedded system such as a set-top box, a personal data assistant (PDA), a wireless communication unit (e.g., cellular phone), or other similar hardware platforms that have information processing and/or data storage and communication capabilities.

In embodiments of the system, communication interface 308 can send and receive electrical, electromagnetic, or optical signals that carry digital data streams representing various types of information including program code. If communication is established via the Internet, server system 130 may transmit program code to host 110 through Internet connection 150. The program code can be executed by central processor unit 301 or is stored in storage media 306 or other non-volatile storage for later execution.

Program code may be transmitted via a carrier wave or may be embodied in any other form of computer program product. A computer program product comprises a medium configured to store or transport computer readable code or a medium in which computer readable code may be embedded. Some examples of computer program products are CD-ROM disks, ROM cards, floppy disks, magnetic tapes, computer hard drives, and network server systems.

In one or more embodiments of the invention, processor 301 is a microprocessor manufactured by Motorola, Intel, or Sun Microsystems Corporations. The named processors are for the purpose of example only. Any other suitable microprocessor, microcontroller, or microcomputer may be utilized.

System Software Environment

Figure 3B:
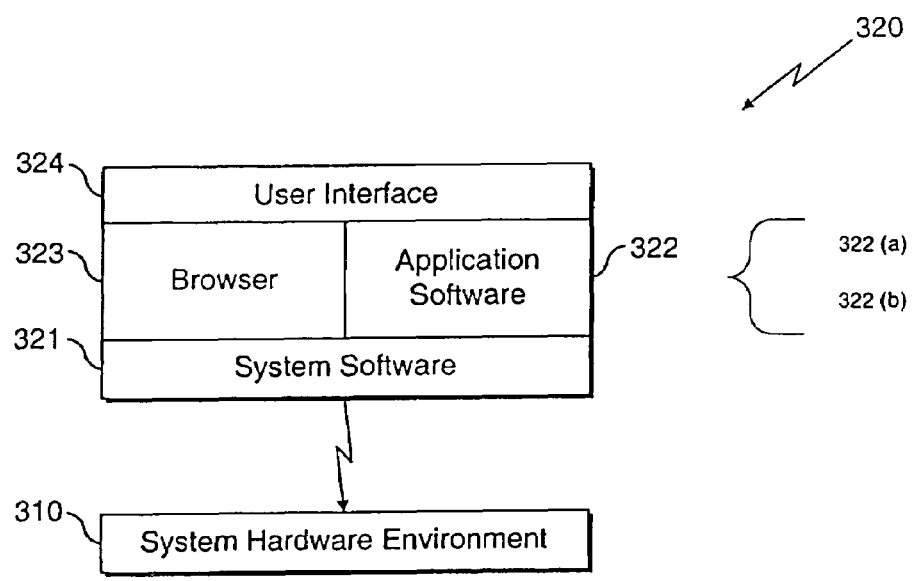
FIG. 3B illustrates computer software suited for managing and directing the operation of the system hardware environment illustrated in FIG. 3A.

FIG. 3B illustrates computer software 320 suited for managing and directing the operation of the system hardware environment described above. Computer software 320 is, typically, stored in storage media 306 and is loaded into memory 302 prior to execution. Computer software 320 includes system software 321 and application software 322. Depending on system implementation, certain aspects of computer software 320 can be loaded on one or more computing systems.

System software 321 includes control software such as an operating system that controls the low-level operations of computing system 310. Low-level operations include the management of the system's resources such as memory allocation, file swapping, and other core computing tasks. In one or more embodiments of the invention, the operating system is Microsoft Windows CE®, Microsoft Windows NT®, Macintosh OS®, or IBM OS/2®. However, any other suitable operating system may be utilized.

Application software 322 can include one or more computer programs that are executed on top of system software 321 after being loaded from storage media 306 into memory 302. In a client-server architecture, application software 322 may include a client software 322(a) and a server software 322(b). Referring to FIG. 1 for example, in one embodiment of the invention, client software 322(a) is executed on host 110 and server software 322(b) is executed on server 130.

Computer software 320 may also include a web browser software 323 for communicating with the Internet. Further, computer software 320 includes a user interface 324 (e.g., a Graphical User Interface (GUI)) for receiving user commands and data. The commands and data received are processed by the software applications that run on the computing system 310. The system architectures and environments described above are for purposes of example only. Embodiments of the invention may be implemented in any type of system architecture or processing environment.

Application Software for Detecting and Communicating With a Peripheral Device

Figure 4:
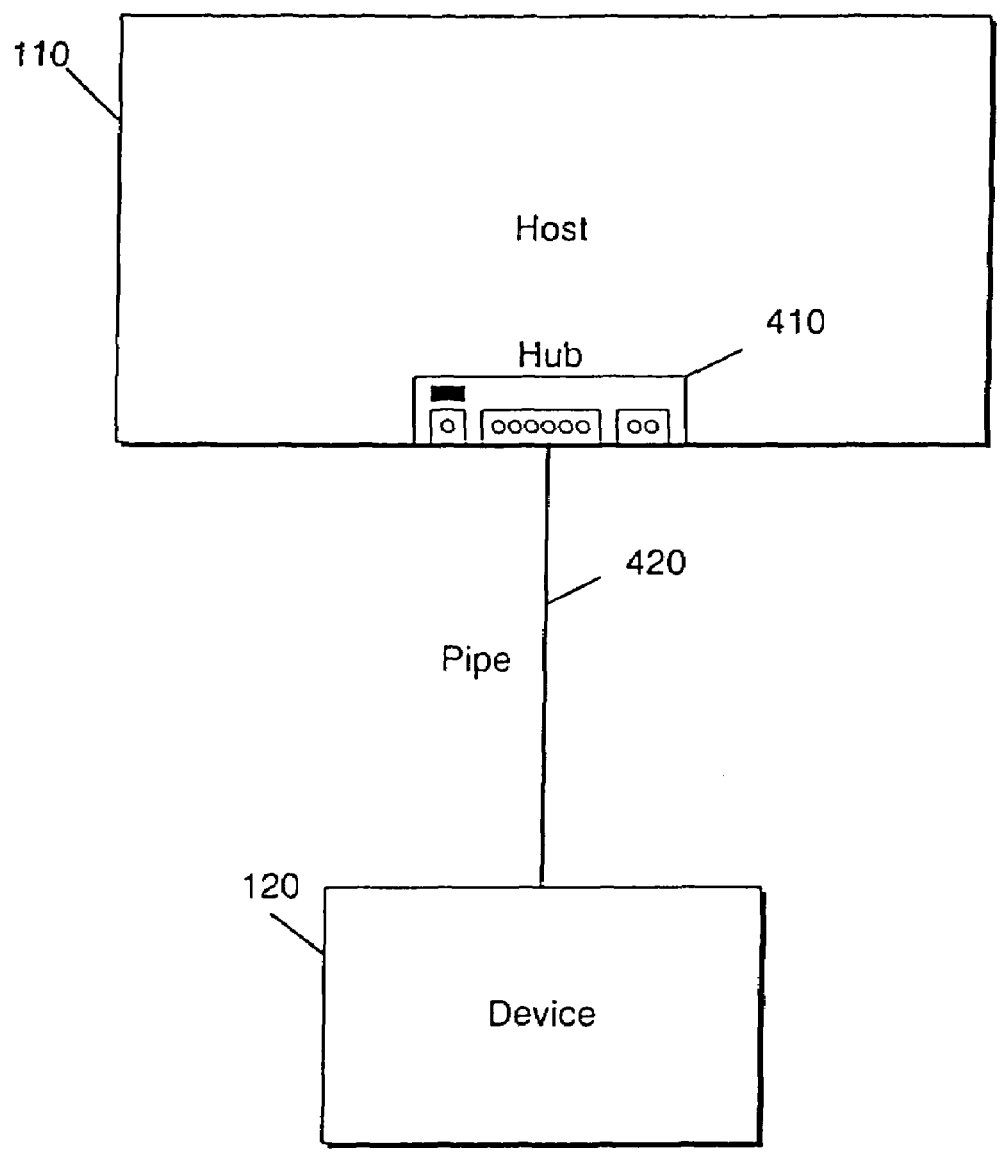
FIG. 4 illustrates the host system including a hub to which a peripheral device attaches.

In accordance with one or more aspects of the invention, application software 322 runs partly on host system 110 and partly on server system 130 and is directed to a method of detecting the attachment a peripheral device 120 to a host 110. Client application 322(a) is the part of application software 322 that runs on host 110 and depends on certain components of host 110 to detect the attachment of device 120. FIG. 4 illustrates a block diagram of host 110 and device 120 attached together via pipe 420. Pipe 420 is a logical association between host 110 and device 120 implemented to promote communication between host 110 and device 120.

According to one aspect of the invention, host 110 includes a high-speed bus. A bus typically refers to a common pathway or channel for transfer of data between multiple components of a system. The high-speed bus of the invention, in one or more embodiments, is implemented based on technologies such as Universal Serial Bus® (USB) or Firewire® (IEEE Standard 1394). USB is a hardware interface for connecting standard peripheral devices such as the keyboard, mouse, joystick, scanner, printer, and telephony devices to a computing system. USB can typically support the attachment of up to 127 devices. Firewire or the IEEE 1394 standard is a high-speed serial bus developed by Apple and Texas Instruments that allows for the connection of up to 63 devices. In one or more embodiments of the system, host 110 uses the above bus technologies to detect the attachment of and identify device 120.

As shown in FIG. 4, in accordance with one aspect of the invention, host 110 includes a hub 410 to which device 120 attaches via pipe 420. Hubs are wiring concentrators that define an attachment point in a bus (e.g., USB) architecture. An attachment point is typically an addressing scheme that corresponds with a unique identifier which allows the host to communicate with the attached peripheral. Attachments points are also referred to as ports. In embodiments of the invention, device 120 can be attached to one or more ports on hub 140. When device 120 attaches to host 110, an embedded hub (i.e., root hub) at host 110 senses the presence of device 120 on a port and interrogates device 120 for identifying information.

Figure 5:
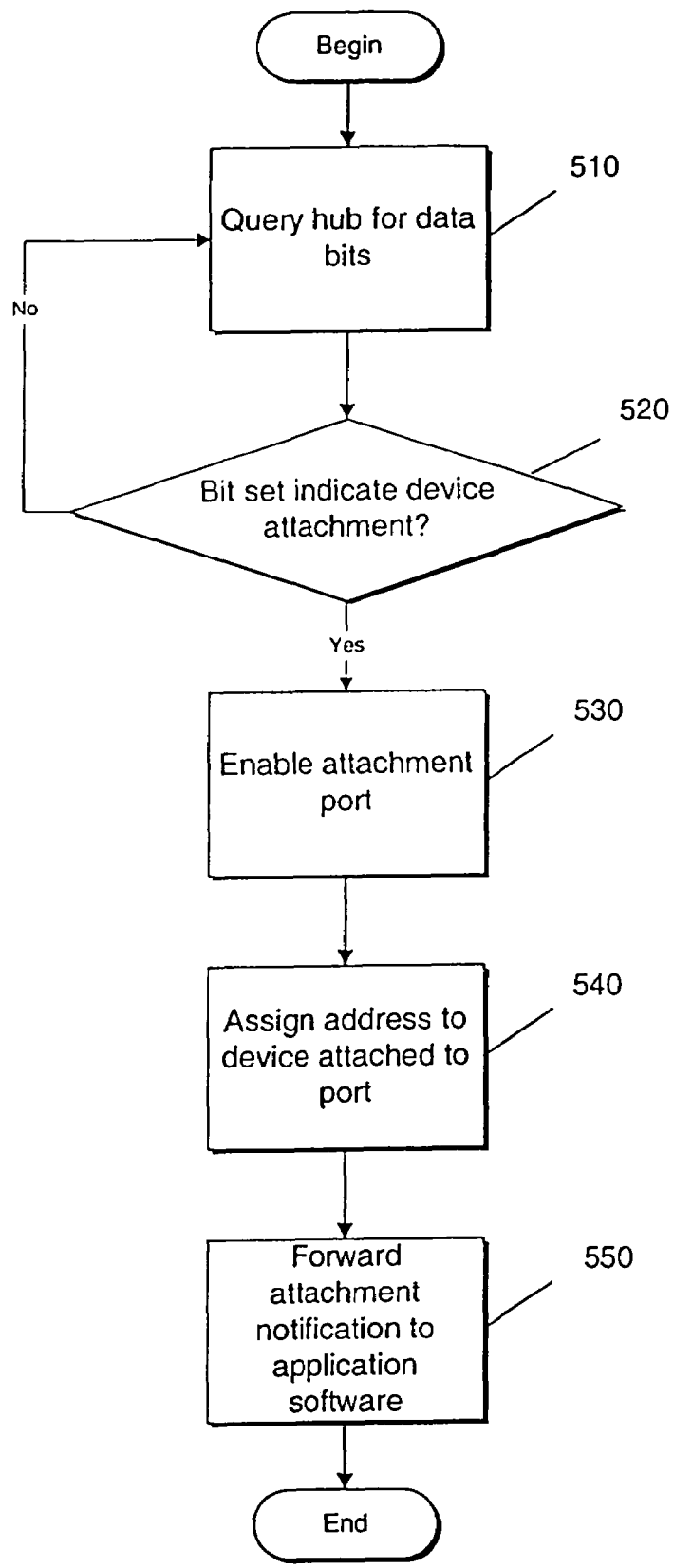
FIG. 5 illustrates a flow diagram of a method of detecting the attachment of a peripheral device to a host system.

Hubs are associated with status bits that are used to detect and report the attachment or removal of a device on a port. A change in configuration of status bits indicates the attachment or removal of a device. FIG. 5 illustrates a flow diagram of a method by which host system 110 detects the attachment of device 120. Referring to FIG. 5, host 110 at step 510 (and periodically) queries hub 410 for status bits to detect the attachment of a device.

At step 520, if the configuration of status bits do not indicate the attachment of a device then the system reverts back to step 510 and continues to wait until the attachment of a device is detected. Otherwise, once the change in configuration of status bits indicate the attachment of a device, at step 530, host 110 enables the attachment port. A port is enabled when electrical power is supplied to the port as the result of writing registers in system hardware. At step 540, the system enumerates the port to which the device is attached by assigning a unique address to it.

Host 110 can access device 120 by referencing the unique address assigned to it as the result of the enumeration activity. In embodiments of the system, host 110 establishes a control pipe 420 with device 120 using the assigned unique address and endpoint number 0. An endpoint is a uniquely identifiable portion of device 120. Each endpoint is given at design time a unique identifier called endpoint number. Further, each endpoint has a device-determined direction of data flow. The combination of the device address, endpoint number, and data flow direction allows each endpoint to be uniquely referenced by host 110.

As stated above, device 120 is accessible by a unique address. Device 120, in certain embodiments of the system, also supports one or more endpoints with which host 110 may communicate. Device 120 supports a specially designated endpoint 0 to which control pipe 420 attaches. Associated with endpoint 0 is the information required to completely describe device 120. Endpoint 0 provides a communication pipe by which host 110 can submit requests (e.g., standard USB commands) to device 120. Device 120 responds to host 110's requests by forwarding device identifying information.

In one embodiment of the invention, endpoint number 0 is accessible once device 120 is attached and enumerated. Control pipe 420, associated with endpoint number 0, is also called the default control pipe. According to USB standards a USB device is required to implement a default control method (i.e., a default control pipe) that uses both input and output endpoints with endpoint number 0. Typically, the USB system software uses this default control method to initialize and generically manipulate the logical device. In embodiments of the invention, system software 321 includes USB system software.

The USB system software causes, a default control pipe 420 to be established between host 110 and device 120 once the device is powered. Control pipe 420 provides host 110 with access to device 120's configuration, status, and control information. Furthermore, control pipe 420 is used by the host 110's system software to configure and initialize device 120 after attachment. In accordance with one aspect of the invention, control pipe 420 can also be used by device specific software after device 120 is configured. Host 110's system software retains ownership of control pipe 420 and mediates its use by other software. Once host 110 has established a communication and control interface with device 120 through pipe 420, at step 550, an attachment notification is forwarded to client software 322(a) running on host 110.

In one or more embodiments, host 110 interacts with device 120 via system software 321 and client software 322(a). System software 321 and client software 322(a) are loaded and run on host 110. Referring to FIG. 3B, in embodiments of the invention, system software 321 includes the operating system for operating host 110 and other foundation software such as a host controller (not shown). When host 110 is turned on the operating system is loaded into host 110's system memory. The host controller can be either loaded as part of the operating system or on top of the operating system, depending on system implementation. The host controller is part of system software 321 that is responsible for managing control and data flow between host 110 and device 120. As it is described in further detail below, the host controller also performs the task of collecting device status and activity statistics.

Figure 6:
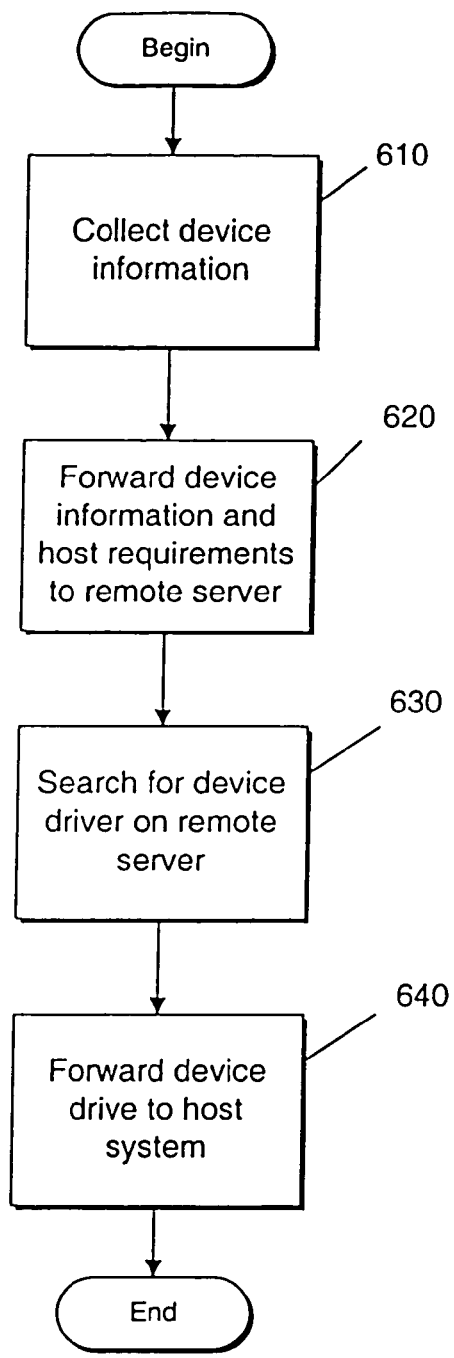
FIG. 6 illustrates a method of locating and loading control software on host 110 after host system been notified of the attachment of the peripheral device.

Once device 120 is detected and identified by host 110, in accordance with one aspects of the invention, special control software for controlling device 120 is loaded on host 110. FIG. 6 illustrates a method of locating and loading control software, particularly a device driver, on host 110 after client software 322(a) receives notification of attachment of device 120 to host 110. A device driver is control software written for a specific device that dictates the precise machine language necessary to communicate with and control that device. Therefore, for each device, a certain device driver needs to be installed on host 110. Thus, system software 321 provides the foundational communication means between host 110 and device 120, while the device driver provides host 110 with specific details on how to communicate with and control device 120.

In embodiments of the invention, at step 610, system software 321 collects device information by querying device 120 using the standard mechanisms built into system software's communication protocol (e.g., the USB protocol). A device typically represents itself to a host system using a standardized set of data structures described in the system communication protocol specifications. In one or more embodiments of the invention, device 120 is a USB device and thus represents itself to host 110 based on standards set forth in the USB specifications. To collect device information, the host controller software requests from device 120 to forward the device descriptor for device 120 to endpoint 0 at the default USB address. In response to the request, device 120 forwards its device descriptor to host 110. A device descriptor includes specific information about a device's specific communication requirements and control architecture.

In one or more embodiments of the system, the device descriptor, for example, includes the following information about device 120: device class, device subclass, device protocol, vendor identification number (e.g., IdVendor), product identification number (e.g., IdProduct), manufacturer information (e.g., iManufacturer), product information (e.g., iproduct), product serial number (iSerialNumber), and binary coded decimal device identifier (BcdDevice). It should be noted that the above provided list is not inclusive. Further information or items may be included or excluded from the above list depending on system implementation or type of device attached to host 110.

For example, in certain embodiments of the invention, in addition to the above information, the device descriptor may also include information about an operating software platform (e.g., Microsoft Windows 2000®, UNIX®, Mac OS®, etc.) or computing hardware platform (Pentium®, SPARC®, PowerPC®, etc.) that are compatible with the requirements of device 120. Access to the above device specific information enables host 110 to determine whether its operating environment is compatible with device 120's system requirements. Further, based on the above information host 110 can determine how to communicate with and control device 120.

Host 110 collects sufficient information about device 120 based on the device descriptor to identify the type and requirements of device 120. Thereafter, host 110 attempts to locate a control software or driver for device 120 based on the collected information. If the driver is locally accessible, then system software 321 loads the driver on host 110. A driver is considered locally available if it is stored on host 110 or device 120.

If system software 321 fails to locate the appropriate driver for device 120, or in order to install and load a new version of an outdated locally accessible driver, system software 321 transfers control to client software 322(*a*) by loading a proxy class driver. A proxy driver is a portion of client software 322(*a*), or a portion of system software 321 running on host system 110, that depending on system implementation, acts as a temporary substitute driver when no driver is found for a device attached to the system, or when a present driver is out dated. Once the proxy class driver is loaded, it acts as a client that communicates with server 130 to locate the appropriate device driver.

Client software 322(*a*) accesses device information collected by system software 321, at step 610. At step 620, using the device information, client software 322(*a*) forwards a request packet across network connection 150 (e.g., a standard TCP/IP network connection) to remote sever system 130. Server system 130 can be connected to host 110 in a local area network (LAN). Alternatively, it may be accessible over a wide area network (WAN), such as the Internet. The submitted request packet includes sufficient information for server 130 to find a device driver that is compatible with host 110 and device 120.

The design of a device driver is not only dependent on the specifications of the peripheral device it is implemented to drive, but also on the host's hardware and software platform to which the device attaches. Particularly, in embodiments of the invention applicable to embedded hosts, system software 321 is proprietary software developed by the manufacturer of the host device. As such, in embodiments of the invention, the submitted request to server 130, in addition to device specific information (e.g., information obtained from the device descriptor), also includes host specific information (e.g., information defining hardware configuration and operating system specifications of host 110). Client software 322(*a*), at step 620, forwards all device and host specific information to server software 322(*b*) running on server 130.

Server software 322(*b*) is implemented to run on server system 130 to service submitted requests by client software 322(*a*). Server 130, in accordance with one aspect of the invention, includes database 140 used for storing one or more control software applications (e.g., device drivers) for controlling one or more peripheral devices. Information included in database 140 can be either locally stored in one or more storage devices in server 130 or can be implemented across one or more platforms linked to server 130 (e.g., in a distributed network environment).

Server software 322(*b*) running on server 130 receives a request submitted by client software 322(*a*) for finding a device driver for device 120 that can be integrated with host 110's system software 321. At step 630, server software 322(*b*) after analyzing the request based on device and host specific information included therein, searches database 140 for available drivers that can satisfy the limitations and requirements of host 110 and device 120. In embodiments of the invention, an appropriate driver in addition to matching the device class, manufacturer, product id, serial number, or vendor id for device 120, also verifies that the device driver can appropriately interface with the operating system and hardware platform of host 110.

If a compatible driver is found, server software 322(*b*) includes the driver's executable code in a communication packet and forwards it to host 110, at step 640. Client software 322(*a*) receives the packet forwarded by server 130 depacketizes driver's executable code and installs it on host 110. In embodiments of the invention, the format of the driver code is in object form such that client software 322(*a*) can load the driver into a storage medium (e.g., system memory) in host 110. Client software 322(*a*) then incorporates the driver code into system software 321 to enable host 110 to support device 120. The device driver, once installed and loaded, provides system software 321 with instruction on how to communicate with device 120.

According to one or more aspects of the system, client software 322(*a*) includes a proxy class driver that allocates the appropriate memory and other system resources needed to load the executable object code received from server 130 into system software 321. The executable object code is installed and loaded on host 110 by the proxy class driver. The proxy class driver is responsible for loading the driver into memory. The proxy class driver sets up the needed memory, stacks code segments, and calls the device driver's entry point. An entry point is a reference to a callable function. The device driver then registers the device driver with system software 321 (e.g., the operating system) and takes over control of communications with the device.

In embodiments of the invention, host 110 stores the object code for the device driver received from server system 130 in a long term storage medium (e.g., hard drive). Storing the driver allows system software 321 to instantly load the driver when it detects the attachment of the device associated with that driver instead of submitting a request to server 130. In embodiments of the invention that do not include long term storage media, a reference to the remote storage location (e.g., the Internet site where the device driver was found) of the driver is preserved, in a cache for example. Cache, pronounced "cash," is a readily accessible data storage area that holds frequently or recently referenced information and is typically used to speed up data transfer or retrieval.

As such, client software 322(*a*) forwards a request to server software 322(*b*) with the exact location where the driver for a particular device can be found, thereby forgoing the need for a search to find the driver all over again. In certain embodiments of the invention, client software 322(*a*) periodically submits a request to server software 322(*b*) to search database 140 for any updated versions of the control software or device driver for device 120, for example, to insure that the latest version is available on host 110.

Examplary Embodiment Based on USB Architecture

The following includes the description of an examplary embodiment of the invention as applicable to the USB architecture, in order to provide a better understanding of the invention. It is noteworthy that the following description is provided by way of example, however, and should not be construed to limit the invention to the USB architecture only.

In one or more embodiments of the invention, a USB device is connected to a host system via a USB port on the system bus. Once the device is detected by the host system through the enumeration process, the host system searches for a driver for the USB device. The USB device enumerator communicates with various class drivers including the operating system (O.S.) specific class drivers. The device enumerator maintains information about the USB tree typology and various information and handles related to each device currently on the bus. The enumerator uses the USB device driver (USB Bus Class Driver) to send and receive information to each of the various devices.

The Bus Class Driver is specific to a particular bus interface, such as, USB, 1394, for example, so that the Application Program Interface (API) to a specific bus interface is standard for all devices and applications that utilize the bus. In addition, this interface provides more flexibility in moving from one bus architecture to another. Each type of USB device has a class associated with it. For example, the Human Interface Device (HID) class driver is used for keyboards and mice, where as the Printer class driver, supports USB printers. Currently there are seven classes defined by the USB organization, these are the Human Interface Device Class, Printer Device Class, Power Device Class, Monitor Device Class, Audio Device Class, Communications Device Class, and Common Class. Built into the USB architecture is a class driver which can be operating system specific, that is, a standard API for communicating with devices on the USB Bus that do not have a specific class type.

The USB device driver (USB Bus Class Driver) is a defined API used for communicating on the USB bus and is hardware independent. This driver layer controls all of the USB specific functions and various communications on the bus. In accordance to one or more aspects of the invention, a class driver is developed so that the API to a specific class of devices is standard for all devices of that particular class. The above-described layered architecture allows the implementation of a proxy class that can communicate with existing software architectures on a host system to find the appropriate device driver for a detected device.

The concept of the proxy class can be extended to monolithic driver architectures, as well. In a monolithic architecture, system software is designed to control and communicate with a particular device or hardware portion, while in a layered architecture the top layers are implemented independent from the specific hardware design and thus can provide general support for a set of hardware interfaces. Win32 Driver Model (WDM) is an example of layered device driver architecture that consolidates drivers for Windows 95/98 and Windows NT. It allows a hardware vendor to write one Windows driver for its peripheral device that works with both Win 95/98 and NT.

In certain embodiments of the system, the proxy acts as a driver on behalf of the device if the device does not have support within the host system software at the time the device is first detected. The proxy driver is not capable of controlling or communicating with the device, outside of the standard USB commands. The proxy class, however, is capable of searching for a driver capable of supporting the newly inserted device. The proxy class searches either a local database or a remote database server in communication with the host system. The proxy class gets information from the device via the standard USB requests for descriptor information. Using this information along with other information gathered from the operating system (i.e. operating system, hardware, cpu), the proxy class submits a request to the database for a driver suitable for the device, operating system, and hardware platform. In response, the server forwards a loadable driver module (e.g., object code) capable of driving the device, or an error message, if the server is unable to find an appropriate driver.

In accordance with an aspect of the invention, if a suitable driver is found, the proxy driver will load the newly downloaded object code into host system's memory. The object code will have specific entry points (callable functions) that must be implemented by the loaded driver. In some embodiments, a header is present with the object code, such that, the proxy class can determine where the various entries points are contained within the binary file and how the proxy class can locate the loadable code such that it can be run within the operating system. The loadable object code forwarded by the server includes the appropriate functionality and interfaces so that it can integrate with the host's operating system and take over control and communication with the device attached to the host system.

In embodiments of the invention, to integrate the object code with the host's operating system, the proxy class is loaded on a particular platform and tied into the given software architecture. The following code segment, is an examplary method by which the object code registers itself with the layered device driver architecture of the invention that is implemented to provide an interface between class drivers and the operating system.

```
void PROXY_StartDriver( )
{
    st_REGISTER_PROXY USBRegister;
/*
    Need to register the PROXY class to the stack.
    The Proxy class does not specify device class\subclass\protocol
    It owns all device that are not owned by a parent class
*/
    USBRegister.RDEntryPointStart=(FUNCPTR)PROXY_Start;
    USBRegister.RDEntryPointStop=(FUNCPTR)PROXY_Stop;
    CLASS_RegisterProxy(&USBRegister);
    return;
}
UINT CLASS_RegisterProxy(st_REGISTER_PROXY *Driver)
{
    ProxyStart=Driver->RDEntryPointStart;
    ProxyStop=Driver->RDEntryPointStop;
    return(SUCCESS);
}
```

The PROXY_StartDriver is called during the system startup. The execution of this code registers a set of function calls with the USB driver stack. These entry points are called whenever no other class driver is found to support an attached device upon insertion. Once a device is inserted and after the proxy class and its entry point are registered with the underlying software layer, the underlying layers provide a communication channel to provide basic communication with the device. Thereafter, either the underlying layer or the proxy class itself can request information from the device using the standard USB protocol commands. These commands are explained in section 9.4 of the USB 1.1 Specification. Examples of some of these commands are provided below.

| | |
|---|---|
| GET_STATUS | This request returns status for the specified recipient. |
| CLEAR_FEATURE | This request is used to clear or disable a specific feature. |
| SET_FEATURE | This request is used to set or enable a specific feature. |
| SET_ADDRESS | This request sets the device address for all future device accesses. |
| GET_DESCRIPTOR | This request returns the specified descriptor if the descriptor exists. |
| SET_DESCRIPTOR | This request may be used to update or adding descriptors. |
| GET_CONFIGURATION | This request returns the current device configuration value. |
| SET_CONFIGURATION | This request sets the device configuration. |
| GET_INTERFACE | This request returns the selected alternate setting for the specified interface. |
| SET_INTERFACE | This request allows the host to select an alternate setting for specified interface. |
| SYNCH_FRAME | This request is used to set and then report an endpoint's synchronization frame. |

In The GET_DESCRIPTOR command, for example, is used to retrieve the various descriptors that are present in the USB device. USB commands are sent via a default pipe also known as endpoint0 and act as a control endpoint. Every USB device compliant with the USB specification is required to implement a plurality of descriptors. In one or more embodiments of the invention the USB device is represented by a plurality of descriptors, including device descriptor, configuration descriptor, interface descriptor, endpoint descriptor, and string descriptor. Tables one through five include the description of various fields included in each of the above-named descriptors and the details associated with those fields, in accordance with *Universal Serial Bus Specification Revision* 1.1, *Chapter 9.5*.

TABLE 1

DEVICE DESCRIPTOR

| Offset | Field | Size | Value | Description |
|---|---|---|---|---|
| 0 | Blength | 1 | Number | Size of this descriptor in bytes |
| 1 | BdescriptorType | 1 | Constant | DEVICE Descriptor Type |
| 2 | BcdUSB | 2 | BCD | USB Specification Release Number in Binary-Coded Decimal (i.e., 2.10 is 0x210). This field identifies the release of the USB Specification that the device and its descriptors are compliant with. |
| 4 | BdeviceClass | 1 | Class | Class code (assigned by USB). If this field is reset to 0, each interface within a configuration specifies its own class information and the various interfaces operate independently. If this field is set to a value between 1 and 0xFE, the device supports different class specifications on different interfaces and the interfaces may not operate independently. This value identifies the class definition used for the aggregate interfaces. (For example, a CD-ROM device with audio and digital data interfaces that require transport control to eject CDs or start them spinning.) If this field is set to 0xFF, the device class is vendor specific. |
| 5 | BDeviceSubClass | 1 | SubClass | Subclass code (assigned by USB). These codes are qualified by the value of the bDeviceClass field. If the bDeviceClass field is reset to 0, this field must also be reset to 0. If the bDeviceClass field is not set to 0xFF, all values are reserved for assignment by USB. |
| 6 | BdeviceProtocol | 1 | Protocol | Protocol code (assigned by USB). These codes are qualified by the value of the bDeviceClass and the bDeviceSubClass fields. If a device supports class-specific protocols on a device basis as opposed to an interface basis, this code identifies the protocols that the device uses as defined by the specification of the device class. If this field is reset to 0, the device does not use class specific protocols on a device basis. However, it may use |

TABLE 1-continued

DEVICE DESCRIPTOR

| Offset | Field | Size | Value | Description |
|---|---|---|---|---|
| | | | | class specific protocols on an interface basis. If this field is set to 0xFF, the device uses a vendor specific protocol on a device basis. |
| 7 | BmaxPacketSize0 | 1 | Number | Maximum packet size for endpoint zero (only 8, 16, 32, or 64 are valid) |
| 8 | IdVendor | 2 | ID | Vendor ID (assigned by USB) |
| 10 | IdProduct | 2 | ID | Product ID (assigned by the Manufacturer) |
| 12 | BcdDevice | 2 | BCD | Device release number in binary-coded decimal |
| 14 | Imanufacturer | 1 | Index | Index of string descriptor describing manufacturer |
| 15 | Iproduct | 1 | Index | Index of string descriptor describing product |
| 16 | IserialNumber | 1 | Index | Index of string descriptor describing the device's serial number |
| 17 | BNumConfigurations | 1 | Number | Number of possible configurations |

A device descriptor describes general information about a USB device. It includes information that applies globally to the device and all of the device's configurations. As explained earlier, USB devices have an endpoint zero used by the default pipe. In certain embodiments of the system, the maximum packet size of a device's endpoint zero is described in the device descriptor. Endpoints specific to a configuration and its interface(s) are described in the configuration descriptor. A configuration and its interface(s) do not include an endpoint descriptor for endpoint zero.

The descriptor describes the number of interfaces provided by the configuration. Each interface may operate independently. For example, an ISDN device might be configured with two interfaces, each providing 64 kBs bi-directional channels that have separate data sources or sinks on the host. Another configuration might present the ISDN device as a single interface, bonding the two channels into one 128 kBs bidirectional channel, for example. When the host requests the configuration descriptor, all related interface and endpoint descriptors are returned.

TABLE 2

CONFIGURATION DESCRIPTOR

| Offset | Field | Size | Value | Description |
|---|---|---|---|---|
| 0 | Blength | 1 | Number | Size of this descriptor in bytes |
| 1 | BDescriptorType | 1 | Constant | CONFIGURATION |
| 2 | WTotalLength | 2 | Number | Total length of data returned for this configuration. Includes the combined length of all descriptors (configuration, interface, endpoint, and class or vendor specific) returned for this configuration. |
| 4 | BNumInterfaces | 1 | Number | Number of interfaces supported by this configuration |
| 5 | BConfigurationValue | 1 | Number | Value to use as an argument to Set Configuration to select this configuration |
| 6 | IConfiguration | 1 | Index | Index of string descriptor describing this configuration |
| 7 | BMAttributes | 1 | Bitmap | Configuration characteristics D7 Bus Powered D6 Self Powered D5 Remote Wakeup D4..0 Reserved (reset to 0) A device configuration that uses power from the bus and a local source sets both D7 and D6. The actual power source at runtime may be determined using the Get Status device request. If a device configuration supports remote wakeup, D5 is set to 1. |

TABLE 2-continued

CONFIGURATION DESCRIPTOR

| Offset | Field | Size | Value | Description |
|---|---|---|---|---|
| 8 | MaxPower | 1 | mA | Maximum power consumption of USB device from the bus in this specific configuration when the device is fully operational. Expressed in 2 mA units (i.e., 50 = 100 mA). Note: A device configuration reports whether the configuration is bus-powered or self-powered. Device status reports whether the device is currently self-powered. If a device is disconnected from its external power source, it updates device status to indicate that it is no longer self-powered. A device may not increase its power draw from the bus, when it loses its external power source, beyond the amount reported by its configuration. If a device can continue to operate when disconnected from its external power source, it continues to do so. If the device cannot continue to operate, it fails operations it can no longer support. Host software may determine the cause of the failure by checking the status and noting the loss of the device's power source. |

A USB device has one or more configuration descriptors. Each configuration has one or more interfaces and each interface has one or more endpoints. An endpoint is not shared among interfaces within a single configuration unless the endpoint is used by alternate settings of the same interface. Endpoints may be shared among interfaces that are part of different configurations without this restriction. Once configured, devices may support limited adjustments to the configuration. If a particular interface has alternate settings, an alternate may be selected after configuration.

A configuration provides one or more interfaces, each with its own endpoint descriptors describing a unique set of endpoints within the configuration. When a configuration supports more than one interface, the endpoints for a particular interface immediately follow the interface descriptor in the data returned by the Get Configuration request.

TABLE 3

INTERFACE DESCRIPTOR

| Offset | Field | Size | Value | Descriptor |
|---|---|---|---|---|
| 0 | Blength | 1 | Number | Size of this descriptor in bytes |
| 1 | BDescriptorType | 1 | Constant | INTERFACE Descriptor Type |
| 2 | BInterfaceNumber | 1 | Number | Number of interface. Zero-based value identifying the index in the array of concurrent interfaces supported by this configuration. |
| 3 | BAltenateSetting | 1 | Number | Value used to select alternate setting for the interface identified in the prior field |
| 4 | BNumEndpoints | 1 | Number | Number of endpoints used by this interface (excluding endpoint zero). If this value is 0, this interface only uses endpoint zero. |
| 5 | BinterfaceClass | 1 | Class | Class code (assigned by USB) If this field is reset to 0, the interface does not belong to any USB specified device class. If this field is set to 0xFF, the interface class is vendor specific. All other values are reserved for assignment by USB. |

TABLE 3-continued

INTERFACE DESCRIPTOR

| Offset | Field | Size | Value | Descriptor |
|---|---|---|---|---|
| 6 | BInterfaceSubClass | 1 | SubClass | Subclass code (assigned by USB). These codes are qualified by the value of the bInterfaceClass field. If the bInterfaceClass field is reset to 0, this field must also be reset to 0. If the bInterfaceClass field is not set to 0xFF, all values are reserved for assignment by USB. |
| 7 | BInterfaceProtocol | 1 | Protocol | Protocol code (assigned by USB). These codes are qualified by the value of the bInterfaceClass and the bInterfaceSubClass fields. If an interface supports class-specific requests, this code identifies the protocols that the device uses as defined by the specification of the device class. If this field is reset to 0, the device does not use a class specific protocol on this interface. If this field is set to 0xFF, the device uses a vendor specific protocol for this interface. |
| 8 | Interface | 1 | Index | Index of string descriptor describing this interface |

An interface descriptor is returned as part of a configuration descriptor. An interface may include alternate settings that allow the endpoints and/or their characteristics to be varied after the device has been configured. The default setting for an interface is alternate setting zero. The Set Interface request is used to select an alternate setting or to return to the default setting. The Get Interface request returns the selected alternate setting. Alternate settings allow a portion of the device configuration to be varied while other interfaces remain in operation. If a configuration has alternate settings for one or more of its interfaces, a separate interface descriptor and its associated endpoints are included for each setting.

If a device configuration supported a single interface with two alternate settings, the configuration descriptor is followed by an interface descriptor with the bInterfaceNumber and bAlternateSetting fields set to zero and then the endpoint descriptors for that setting, followed by another interface descriptor and its associated endpoint descriptors. The second interface descriptor's bInterfaceNumber field would also be set to zero, but the bAlternateSetting field of the second interface descriptor would be set to one.

In accordance with one or more embodiments if the invention, if an interface uses endpoint zero, no endpoint descriptors follow the interface descriptor and the interface identifies a request interface that uses the default pipe attached to endpoint zero. In this case, the bNumEndpoints field shall be set to zero. An interface descriptor may not include endpoint zero in the number of endpoints.

TABLE 4

ENDPOINT DESCRIPTOR

| Offset | Field | Size | Value | Description |
|---|---|---|---|---|
| 0 | Blength | 1 | Number | Size of this descriptor in bytes |
| 1 | BDescriptorType | 1 | Constant | ENDPOINT Descriptor Type |
| 2 | BEndpointAddress | 1 | Endpoint | The address of the endpoint on the USB device described by this descriptor. The address is encoded as follows: Bit 0..3: The endpoint number Bit 4..6: Reserved, reset to 0 Bit 7: Direction, ignored for control endpoints 0 OUT endpoint 1 IN endpoint |
| 3 | BmAttributes | 1 | Bitmap | This field describes the endpoint's attributes when it is configured using the bConfiguration Value. Bit 0 .. 1: Transfer Type 00 Control 01 Isochronous 10 Bulk 11 Interrupt |

TABLE 4-continued

ENDPOINT DESCRIPTOR

| Offset | Field | Size | Value | Description |
|---|---|---|---|---|
| 4 | WMaxPacketSize | 2 | Number | Maximum packet size this endpoint is capable of sending or receiving when this configuration is selected. For isochronous endpoints, this value is used to reserve the bus time in the schedule, required for the per frame data payloads. The pipe may, on an ongoing basis, actually use less bandwidth than that reserved. The device reports, if necessary, the actual bandwidth used via its normal, non-USB defined mechanisms. For interrupt, bulk, and control endpoints smaller data payloads may be sent, but will terminate the transfer and may or may not require intervention to restart. |
| 6 | Binterval | 1 | Number | Interval for polling endpoint for data transfers. Expressed in milliseconds. This field is ignored for bulk and control endpoints. For isochronous endpoints this field must be set to 1. For interrupt endpoints, this field may range from 1 to 255. |

In embodiments of the invention, each endpoint used for an interface has its own descriptor. This descriptor contains the information required by the host to determine the bandwidth requirements of each endpoint. An endpoint descriptor is returned as part of a configuration descriptor.

TABLE 5

STRING DESCRIPTOR

| Offset | Field | Size | Value | Description |
|---|---|---|---|---|
| 0 | Blength | 1 | Number | Size of this descriptor in bytes |
| 1 | BDescriptorType | 1 | Constant | STRING Descriptor Type |
| 2 | Bstring | n | Number | UNICODE encoded string |

In certain embodiments, string descriptors are optional. If a device does not support string descriptors, references to string descriptors within device, configuration, and interface descriptors are reset to zero. String descriptors use UNICODE encoding as defined by *The Unicode Standard, Worldwide Character Encoding, Version* 1.0, Volumes 1 and 2, The Unicode Consortium, Addison-Wesley Publishing Company, Reading, Mass. The UNICODE string descriptor is not NULL terminated. The string length is computed by subtracting two from the value of the first byte of the descriptor.

Typically, the system software tries to match a driver loaded on the system with the newly found hardware or attached device. If, however, the system software is unable to locate a driver, the proxy class' entry function which was registered early will be called. An example of the code defining an entry point to the proxy class is listed below:

```
UINT PROXY_BuildResolverInfo(st_PROXY_REQUEST_DRIVER *ProxyRequest,
        UINT Address, UINT Configuration, UINT Interface)
    {
    st_URB_INTERFACE_INFO   InterfaceUrb;
    st_URB_DEVICE_INFO      DeviceUrb;
    st_URB_GET_STRING       StringUrb;
    UINT                    Result;
    UCHAR                   *Buffer;
/*
    Get the ProductID and VendorID for the unknown device
*/
    DeviceUrb.Header.Function=USB_GET_DEVICE_DESCRIPTOR;
    DeviceUrb.Header.DeviceAddress=Address;
    Result=USB_GetDeviceDescriptor(&DeviceUrb);
    if(Result)
        return(ERROR);
/*  Save the Vendor Info */
    ProxyRequest->PC_IdVendor=DeviceUrb.DeviceDescriptor.idVendor;
    ProxyRequest->PC_IdProduct=DeviceUrb.DeviceDescriptor.idProduct;
```

-continued

```
    ProxyRequest->PC_IManufacturer=DeviceUrb.DeviceDescriptor.iManufacturer;
    ProxyRequest->PC_IProduct=DeviceUrb.DeviceDescriptor.iProduct;
    ProxyRequest->PC_ISerialNumber=DeviceUrb.DeviceDescriptor.iSerialNumber;
/*
    Get the subclass and the protocol for the unknown device
*/
    if(Configuration!=-1&&Interface!=-1)
        {
    InterfaceUrb.Header.Function=USB_GET_INTERFACE_DESCRIPTOR;
        InterfaceUrb.Header.DeviceAddress=Address;
            InterfaceUrb.SelectedConfiguration=Configuration;
            InterfaceUrb.SelectedInterface=Interface;
            Result=USB_GetInterfaceDescriptor(&InterfaceUrb);
            if(Result)
                return(ERROR);
/*
    Save the class, subclass and protocol
*/
            ProxyRequest-
>PC_Class=InterfaceUrb.InterfaceDescriptor.bInterfaceClass;
            ProxyRequest->PC_SubClass
                =InterfaceUrb.InterfaceDescriptor.bInterfaceSubClass;
            ProxyRequest-
>PC_Protocol=InterfaceUrb.InterfaceDescriptor.bInterfaceProtocol;
            }
/*
    Get the Device string
    To be DMA Safe, obtain a buffer from DMA Pool
*/
    Buffer=OS_AllocDMAMem(USB_PROXY_STRING_SIZE);
    if(!Buffer)
        return(ERROR);
/*
    Prepare the GET_STRING Urb
*/
    StringUrb.Header.Function=USB_GET_STRING;
    StringUrb.Header.DeviceAddress=Address;
    StringUrb.StringIndex=DeviceUrb.DeviceDescriptor.iProduct;
    StringUrb.MaxLength=USB_PROXY_STRING_SIZE;
    StringUrb.StringBuffer=Buffer;
    StringUrb.SringDecodingFlag=USB_STRING_DECODE_ASCII;
    Result=USB_GetString(&StringUrb);
    if(Result)
            {
            OS_FreeDMAMem(Buffer);
            return(Result);
            }
/*
    Copy the DMA buffer into the caller's buffer
*/
    OS_Memmove(ProxyRequest>PC_DeviceString,Buffer+2,
USB_PROXY_STRING_SIZE);
    OS_FreeDMAMem(Buffer);
            return(SUCCESS); /*JOE 3-20*/
    }
```

In accordance with one aspect of the invention, the PROXY_Start function in turn calls PROXY_BuildResolverInfo which, using the standard USB GET_DESCRIPTOR commands, builds enough information about the device so that a server can determine the best fit for the device. An example of code defining the function listing for PROXY_BuildResolverinfo is listed below:

```
void PROXY_Start(UINT DeviceAddress, UINT DeviceConfiguration, UINT
DeviceInterface)
    {
    UINT                            Result;
    st_PROXY_REQUEST_DRIVER         ProxyRequest;
/*
    Fill the USB proxy data structure to pass to the resolver
*/
```

```
    Result=PROXY_BuildResolverInfo(&ProxyRequest,
        DeviceAddress, DeviceConfiguration, DeviceInterface);
    if(Result)
        return;
/*
    Pass the info to the resolver. The resolver will be implementation
    specific. It's job is to get the driver from somewhere (a remote server)
    change the ownership of the device to the new parent and load it
    the driver on the target. It returns a status
*/
    Result=PROXY_ResolveClass(&ProxyRequest);
    return;
    }
```

After PROXY_Start calls PROXY_BuildResolverInfo, the proxy request is ready to be sent to the server. PROXY_ResolveClass is called which makes a request to the server. An examplary, pseudo code for the PROXY_ResolveClass is listed below:

```
UNIT PROXY_ResolveClass(st_PROXY_REQUEST_DRIVER *ProxyRequest)
    {
        Establish connection with server
        Logon to server
        Pass the proxy Request to server
        Receive response to proxy request
        If(unable to find driver)
            Return ERROR.
/*
    Driver Found
*/
        Read Object Code header
        Determine Object Code Entry functions
        Dynamically Link Object code
        Call Driver Entry Point
        Reset Device
        Return SUCCESS
    }
```

In one or more embodiments of the system, the proxy class uses standard networking protocols to make a connection to the server. Most network software provide the standard Berkeley Standard Distribution (BSD) TCP/UDP-IP for basic connection via a client/server model, for example. These functions are listed below:

| | |
|---|---|
| Accept | Accepts a connection on the specified socket (TCP only). |
| bind | Binds a name to an unnamed socket. |
| closesocket | Closes a socket and severs all connections. |
| connect | Initiates a connection on a socket. |
| fcntlsocket | Gets or sets a descriptor's status flag. |
| getpeername | Gets the name of the peer to which a socket is connected. |
| getsockname | Retrieves the name of a socket. |
| getsockopt | Retrieves the value of a socket option. |
| ip_ConfigureInterface | Configures the IP interface. |
| ip_Get | Retrieves IP information. |
| listen | Listens for incoming connections on a socket (TCP only). |
| recv | Receives data on a socket. |
| recvfrom | Receives data on a socket and retrieves the address of the sending host. |
| select | Determines whether any descriptors are ready for reading or writing, or have an error pending. |
| send | Sends data from a socket. |
| send to | Sends data from a socket. |
| Setsockopt | Sets the value of a socket option. |
| shutdown | Closes, or partially closes, a full-duplex connection by disabling receive and/or send operations on the specified socket. |
| socket | Creates a new socket. |

After the connection is established, the data collected by the proxy driver is sent as a request to the server. The server receives the request and searches the database for a suitable driver using the following criteria:

1) VendorID and ProductID
2) if Class=FFH VendorID+SubClass+Protocol
3) InterfaceClass+InterfaceSubClass+Protocol
4) InterfaceClass+InterfaceSubClass
5) InterfaceClass After the device class has been determined, the server looks for a combination of operating system and hardware platform. If the proper device class is determined, however, a driver is not found for a particular operating system, and an error is returned. If the proper device class is determined and the proper operating system is found, but the proper hardware platform is not found, then the server will return an error. If the proper device class is not determined, the server will return an error, as well.

If the proper driver is found, the server generates a response with information about the driver along with the driver. The information could be a URL to a particular web address, advertisement information, a application executable, or any other associated information. In some embodiments, the proxy class first performs a check sum on the data received from the server to insure that all the information that has been sent by the server has been received by the client application (proxy class). If the data is determined to be valid, the proxy class will then proceed to read the object code header of the driver. As an example, the object code can be compiled to the Executable and Linking Format (ELF) object format developed and published by UNIX System Laboratories (USL) as part of the Application Binary Interface (ABI). The ELF standard is intended to streamline software development by providing developers with a set of binary interface definitions that extend across multiple operating environments.

Object files participate in program linking (building a program) and program execution (running a program). For convenience and efficiency, the object file format provides parallel views of a file's contents, reflecting the differing needs of these activities. An ELF header resides at the beginning and holds a "road map" describing the file's organization. Sections hold the bulk of object file information for the linking view: instructions, data, symbol table, relocation information, and so on. Object files therefore represent some control data with a machine-independent format, making it possible to identify object files and interpret their contents in a common way. Remaining data in an object file use the encoding of the target processor, regardless of the machine on which the file was created.

In embodiments of the invention, using the standard tables built into the object files, the proxy class can determine the entry points within the file that are callable functions by itself and the operating system. This process is call relocation. Relocation is the process of connecting symbolic references with symbolic definitions. For example, when a program calls a function, the associated call instruction must transfer control to the proper destination address at execution. In other words, relocatable files must have information that describes how to modify their section contents, thus allowing executable and shared object files to hold the right information for a process's program image.

In embodiments of the system, after the proxy class relocates the object code into system memory, the loaded driver is ready to be executed. The proxy class calls the loaded driver's entry point, which is responsible for initializing the newly loaded driver, and performs the necessary resource allocation or initialization needed by the driver.

For the driver to assume control of the newly inserted device, the proxy class issues a reset on the device such that the lower layers of software re-enumerate the device. Once the loaded driver's entry point is called and the driver registers itself with the lower level software, resetting of the device causes the lower level software to find the newly loaded driver, and to pass control and communication of the device to it. The listing below is an example of a code within a driver to attach itself to lower level software, according to one or more embodiments of the invention.

```
void AUDIO_StartDriver()
{
    st_REGISTER_DRIVER USBRegister;
/*
    Need to register the AUDIO STREAMING class to the stack.
*/
    USBRegister.RDClass=USB_CLASS_AUDIO;
    USBRegister.RDSubClass=USB_SUBCLASS_AUDIO_STREAMING;
    USBRegister.RDProtocol=USB_PROTOCOL_AUDIO;
    USBRegister.RDOwnerMask=DMASK_IC_IS_IP;
    USBRegister.RDEntryPointDone=(FUNCPTR)AUDIO_TransferDone;
    USBRegister.RDEntryPointStart=(FUNCPTR)AUDIO_Start;
    USBRegister.RDEntryPointStop=(FUNCPTR)AUDIO_Stop;
    AudioClassDriver=CLASS_RegisterDriver(&USBRegister);
}
```

Application Software for Directed Information Delivery

One or more embodiments of the invention are directed to an on-line system that provides directed information delivery to targeted audience who use a particular peripheral device in conjunction with a host system connected to the on-line system. In accordance with one aspect of the invention, application software 322 causes advertisements or other relevant information about a peripheral device or a host system to be displayed to a user, when the host system detects the attachment of the device.

Figure 7:
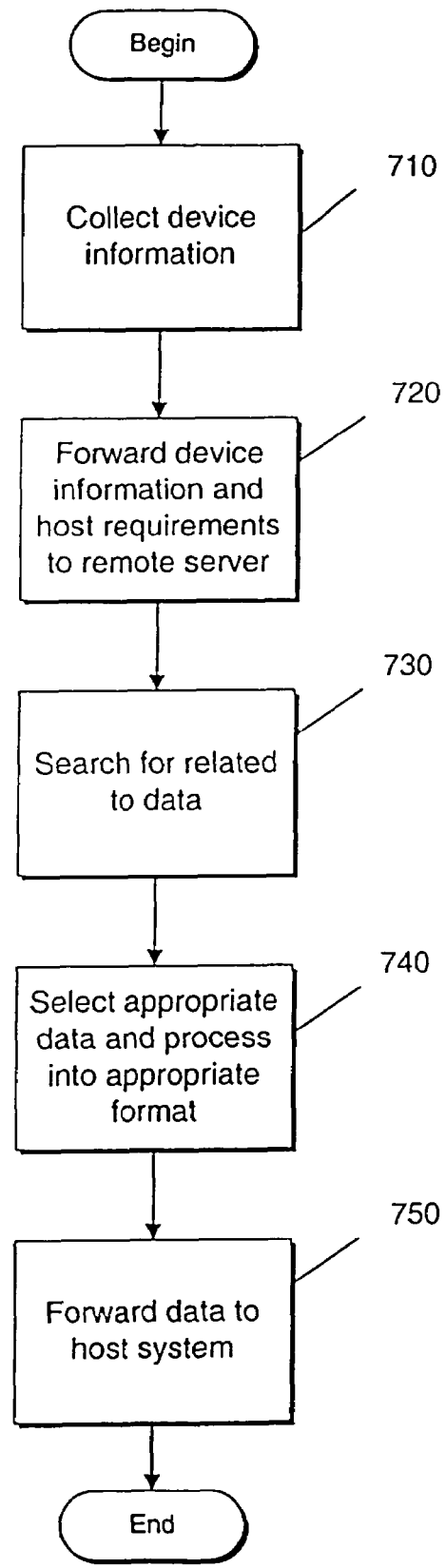
FIG. 7 illustrates a method of directed information delivery to targeted audience who use a particular peripheral device in conjunction with a host system attached to a communication network.

FIG. 7 is a flow diagram illustrating a method of directed delivery of information to a user, in accordance with one or more aspects of the invention. As described in further detail above, when a device 120 is attached to host 110, client software 322(a) running on host 110 is notified of the attachment of device 120. At step 710, client software 322(a) queries device 120 for its device descriptor and collects information such as device class, device protocol, vendor identification number, and other relevant information to identify device 120 and its requirements. Client software 322(a) includes the device specific information in addition to host specific information, such as the operating system running on the host and other system software and hardware specifications in a communication packet and forwards it to server software 322(b) running on server system 130.

Server system 130 includes database 140 wherein bodies of information or references to bodies of information related to various devices or other systems are stored in a structured manner. For example, in one embodiment of the invention, database 140 is a relational database with multiple links implemented across a distributed information system on the Internet. Upon receiving host and device specific information, server software 322(b) at step 730 searches database 140 for any information that can be associated with the device and host specific information forwarded by client software 322(a). The type of information that server software 332(b) may search for includes, for example, promotional or educational material related to products and services associated with device 120 or host 110. The information may be presented in various formats including but not limited to text, pictures, movies, or interactive multimedia applications.

By way of example, if device 120 is a Sony® digital camera attached to host 110, a Visor™ manufactured by Handspring Corporation, then the related information stored in database 140 may include information relating to photo processing mechanisms, hardware and software accessories for the digital camera or the Visor, other products manufactured by Sony or Handspring, other digital cameras or handheld computing devices, or references to on-line resources where additional information about the above products, services, or corporations can be found. Server software 322(b) searches database 140 based on the device and host specific information (e.g., device manufacturer, host operating system, etc.) forwarded to it by client software 322(a). The search results are presented to a user by launching a web browser or a special software application in response to the user selecting a hypertext or hyperlink, for example.

Once presentation data in database 140 is identified, at step 740, server software 322(b) selects the most relevant data and form of presentation for delivery to host 110. In embodiments of the invention, presentation data selected for delivery to a user can be selected or forwarded in a predetermined order, based on demographics or profiles collected about the user, or other factors. In embodiments of the invention, client software 322(a) may be implemented to monitor a user's interaction with host 110 to determine the types of applications the user deploys on host 110 and to formulate an interest profile for the user. If the user installs and/or plays a game of golf on his PDA, for example, then client software 322(a) may send a request to server software 322(b) indicating that the user's area of interest includes golf. In response, server 322(b) will search database 140 for data relating to game of golf, such as information about upcoming events and golf accessories available for sale.

In accordance with one aspect of the invention, once server software 322(b) has identified the presentation data, then the data is formatted with respect to limitations and requirements of host 110 and device 120. The formatting requirements, depend, among other factors, on the bandwidth and graphic display capabilities of host 110. For example, if host 110 is a portable computer then data can be forwarded in a format suitable for display on a monitor that supports a VGA 640×480 resolution. Otherwise, if host 110 is a wireless telephone then the display data may have to be adjusted for a different resolution suitable for display on the wireless telephone. The above formatting requirements, typically, relate to limitation in both hardware and software platforms in host 110.

At step 750, server software 322(b) forwards formatted data to host 110. In embodiments of the invention, the step of formatting data to a meet the requirements of host takes place either before or after data is forwarded at step 750. If data is formatted prior to transmission then server software 322(b) performs the task of reformatting the data. Otherwise, client software 322(a) will analyze and reconfigure the data into a display format compatible with host 120's requirements.

As suggested earlier, forwarded data is displayed to a user some time after the attachment of device 120 to host 110. The data may be stored on host 110 and be redisplayed to the user at a later time, as well. In embodiments of the invention, display of data may be associated with a fee based service, where a third party can promote a service, product, or idea by subscribing to a service provider that provides the on-line services described in this application.

It should be understood that system configurations are disclosed here by way of example. Other system architectures, platforms, and implementations that can support various aspects of the invention may be utilized. Thus, a system and method for configuring a host to recognize and communicate with a peripheral device is described in conjunction with one or more specific embodiments. These and various other adaptations and combinations of features of the embodiments disclosed are within the scope of the invention. The invention is defined by the claims and their full scope of equivalents.

The invention claimed is:

1. A method for directed information delivery to a host system comprising:
   detecting attachment of a hardware device to a host system, wherein a client software running on the host system is notified of the hardware device attachment;
   querying the hardware device for device information, wherein the client software queries the hardware device;
   establishing a connection with a remote server system;
   forwarding to the server system information related to the host system and the hardware device; wherein the host related information includes host operating system information and host system hardware information; and the hardware device information includes device class, device protocol, and vendor identification number to identify the hardware device; and said server system searches the world wide web for information related to the host system and the hardware device based on the host system information and the hardware device information provided to the server system; and a search result includes promotional or educational materials regarding the host system and the hardware device;
   identifying presentation data based on the search result;
   selecting most relevant data from among the presentation data, wherein the most relevant data is based on a user profile based on information collected by the client software;
   formatting the most relevant data for presentation to the user, wherein the formatting is based on a host system limitation and a host system requirement and a hardware device limitation and a hardware device requirement including graphic display capabilities of the host system and available bandwidth; and
   delivering to the host system formatted presentation data.

2. The method of claim 1, wherein the presentation data is selected in a predetermined order based on the user profile and demographics; wherein the user profile is based on a type of software application used by the user.

3. The method of claim 1 wherein said host related information includes specifications about the host systems limitations and the host system requirement.

4. The method of claim 3, wherein the host system limitation and the host system requirement relate to data communication limitations between the host system and the server system.

5. The method of claim 1, wherein the presentation data is formatted by the server system or by the client software running on the host system.

6. The method of claim 1, wherein the presentation data can be stored by a user for re-display at a later time.

7. The method of claim 1, wherein the presentation data is associated with a fee based service, where a third party can promote a service, product and idea by subscribing to a service provider.

8. A system for directed information delivery, comprising:
a host system that detects attachment of a hardware device, wherein a client software running on the host system is notified of the hardware device attachment and the client software queries the hardware device for information; and
a remote server system that receives, via a network connection, host related information and hardware device information, wherein the host related information includes host operating system information and host system hardware information; and the hardware device information includes device class, device protocol, and vendor identification number to identify the hardware device; and said remote server system searches the world wide web for information related to the host system and the hardware device, and a search result includes promotional or educational materials regarding the host system and the hardware device; wherein based on the search result, presentation data is identified and most relevant data from among the presentation data is selected, wherein the most relevant data is based on a user profile based on information collected by the client software; and the most relevant data is formatted for presentation to the user, wherein the presentation data is formatted based on a host system limitation and a host system requirement and a hardware device limitation and a hardware device requirement including graphic display capabilities of the host system and available bandwidth: and the formatted presentation data is delivered to the host system.

9. The system of claim 8, wherein the presentation data can be selected in a predetermined order based the user profile and demographics; wherein the user profile is based on a type of software application used by the user.

10. The system of claim 8, wherein said host related information includes specifications about the host systems limitations and the host system requirement.

11. The system of claim 10, wherein the host system limitations and the host system requirement relate to data communication limitations between the host system and the server system.

12. The system of claim 8, wherein the presentation data is formatted by the server system or by the client software running on the host system.

13. The system of claim 8, wherein the presentation data can be stored by a user for re-display at a later time.

14. The system of claim 8, wherein the presentation data is associated with a fee based service, where a third party can promote a service, product or idea by subscribing to a service provider.

* * * * *